(12) United States Patent
Strömberg

(10) Patent No.: US 11,823,511 B2
(45) Date of Patent: Nov. 21, 2023

(54) PROVIDING ACCESS TO A LOCK FOR A SERVICE PROVIDER USING A GRANT TOKEN AND CREDENTIAL

(71) Applicant: ASSA ABLOY AB, Stockholm (SE)

(72) Inventor: Stefan Strömberg, Stockholm (SE)

(73) Assignee: ASSA ABLOY AB, Stockholm (SE)

( * ) Notice: Subject to any disclaimer, the term of this patent is extended or adjusted under 35 U.S.C. 154(b) by 49 days.

(21) Appl. No.: 17/762,861

(22) PCT Filed: Sep. 29, 2020

(86) PCT No.: PCT/EP2020/077220
§ 371 (c)(1),
(2) Date: Mar. 23, 2022

(87) PCT Pub. No.: WO2021/063941
PCT Pub. Date: Apr. 8, 2021

(65) Prior Publication Data
US 2022/0327875 A1    Oct. 13, 2022

(30) Foreign Application Priority Data
Oct. 1, 2019    (SE) .................................... 1951113-8

(51) Int. Cl.
*G07C 9/00*    (2020.01)
*H04L 9/32*    (2006.01)
(52) U.S. Cl.
CPC ..... *G07C 9/00571* (2013.01); *G07C 9/00309* (2013.01); *H04L 9/3213* (2013.01);
(Continued)
(58) Field of Classification Search
None
See application file for complete search history.

(56) References Cited

U.S. PATENT DOCUMENTS 10,089,801 B1    10/2018  Musabeyoglu et al.
10,728,244 B2 *   7/2020  Trani ....................... H04L 67/00
(Continued)

FOREIGN PATENT DOCUMENTS

SE          1930377        5/2020
WO    WO 2018/104383      6/2018
(Continued)

OTHER PUBLICATIONS

Official Action for Sweden Patent Application No. 1951113-8, dated May 12, 2020, 10 pages.
(Continued)

*Primary Examiner* — K. Wong
(74) *Attorney, Agent, or Firm* — Schwegman Lundberg & Woessner, P.A.

(57) ABSTRACT

According to a first aspect, it is provided a method for providing access to a lock for provision of a service. The method comprises the steps of: receiving a request for access to the lock; sending a consumer request to a service consumer device, asking whether to grant access to the lock; receiving a positive consumer response from the service consumer device; determining validity time for a grant token; obtaining a grant token for the service provider, the grant token having the determined validity time; providing the grant token to the service provider; deleting the grant token in the access coordination server; receiving an agent request for access to the lock for a specific service provider agent device, the agent request comprising the grant token; obtaining a credential for the service provider agent device; and providing the credential to the service provider agent device.

14 Claims, 3 Drawing Sheets

(52) U.S. Cl.
CPC .............. *G07C 2009/00841* (2013.01); *G07C 2209/04* (2013.01)

(56) References Cited

U.S. PATENT DOCUMENTS

| | | |
|---|---|---|
| 2012/0095926 A1 | 4/2012 | Nishimura et al. |
| 2014/0002236 A1 | 1/2014 | Pineau et al. |
| 2014/0282929 A1 | 9/2014 | Tse |
| 2017/0270517 A1 | 9/2017 | Vasu et al. |
| 2017/0352213 A1 | 12/2017 | Bowie |
| 2018/0276613 A1 | 9/2018 | Hall et al. |
| 2019/0028478 A1 | 1/2019 | Love et al. |
| 2019/0130689 A1 | 5/2019 | Baumgarte et al. |

FOREIGN PATENT DOCUMENTS

| | | |
|---|---|---|
| WO | WO 2018/104384 | 6/2018 |
| WO | WO 2019/197441 | 10/2019 |

OTHER PUBLICATIONS

International Search report and Written Opinion for International (PCT) Patent Application No. PCT/EP2020/077220, dated Jan. 12, 2021, 18 pages.
Second Written Opinion for International (PCT) Patent Application No. PCT/EP2020/077220, dated Jul. 15, 2021, 10 pages.
International Preliminary Report on Patentability for International (PCT) Patent Application No. PCT/EP2020/077220, dated Dec. 23, 2021, 25 pages.
Opposition with Machine Translation for Sweden Patent Application No. 1951113-8, dated Nov. 22, 2022, 5 pages.

* cited by examiner

# PROVIDING ACCESS TO A LOCK FOR A SERVICE PROVIDER USING A GRANT TOKEN AND CREDENTIAL

CROSS REFERENCE TO RELATED APPLICATIONS

This application is a national stage application under 35 U.S.C. 371 and claims the benefit of PCT Application No. PCT/EP2020/077220 having an international filing date of Sep. 29, 2020, which designated the United States, which PCT application claimed the benefit of Sweden Patent Application No. 1951113-8 filed Oct. 1, 2019, the disclosure of each of which are incorporated herein by reference.

TECHNICAL FIELD

The invention relates to a method, an access coordination server, a computer program and computer program product for providing access to a lock for a service provider using a grant token and a subsequent credential.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using a personal identification code (PIN) or electronic key. The electronic key and electronic lock can e.g. communicate over a wireless interface. Such electronic locks provide a number of benefits, including improved flexibility in management of access rights, audit trails, key management, etc.

When an owner or user of such an electronic lock consumes a service, that person is here denoted a service consumer. The service can be any service where the person performing the service needs the electronic lock to be opened. For instance, the service can be a delivery of a product, a cleaning service, a builder/plumber/electrician, etc. To be able to consume the service, the service consumer thus needs to provide access to a service provider using the electronic lock. Moreover, there is a careful balance in querying the service consumer for access. On the one hand, the service consumer needs to approve a service provider to allow access. On the other hand, the service consumer should not be bothered with excessive access requests.

SUMMARY

It is an object to provide a solution for providing access to a lock which is applicable for all types of services and where the lock owner is not bothered with excessive access requests.

According to a first aspect, it is provided a method for providing access to a lock for provision of a service, the lock being associated with a service consumer. The method is performed in an access coordination server and comprises the steps of: receiving a request for access to the lock, the request being based on the service consumer ordering a service requiring access to a physical space which is secured by the lock; sending a consumer request to a service consumer device, asking whether to grant access to the lock for service provider to provide the service; receiving a positive consumer response from the service consumer device, indicating that the service consumer allows the service provider to access the physical space secured by the lock; determining validity time for a grant token; obtaining a grant token for the service provider, the grant token having the determined validity time; providing the grant token to the service provider; deleting the grant token in the access coordination server; receiving an agent request for access to the lock for a specific service provider agent device, the agent request comprising the grant token; obtaining a credential for the service provider agent device under a condition that the grant token is valid; and providing the credential to the service provider agent device.

A validity time of the credential may expire before the validity time of the grant token.

The grant token may be unusable as a credential for the lock.

The grant token may be limited in the number of credentials it can be used for. In such a case, the step of obtaining the credential is performed under a condition that the number of credentials for the grant token is not exceeded.

The step of obtaining a grant token may comprise receiving the grant token from a lock manager.

The step of determining a validity time for the grant token may comprise determining the validity time to be a validity time approved in the positive consumer response.

According to a second aspect, it is provided an access coordination server for providing access to a lock for provision of a service, the lock being associated with a service consumer, the method being performed in an access coordination server. The access coordination server comprises: a processor; and a memory storing instructions that, when executed by the processor, cause the access coordination server to: receive a request for access to the lock, the request being based on the service consumer ordering a service requiring access to a physical space which is secured by the lock; send a consumer request to a service consumer device, asking whether to grant access to the lock for service provider to provide the service; receive a positive consumer response from the service consumer device, indicating that the service consumer allows the service provider to access the physical space secured by the lock; determine validity time for a grant token; obtain a grant token for the service provider, the grant token having the determined validity time; provide the grant token to the service provider; delete the grant token in the access coordination server; receive an agent request for access to the lock for a specific service provider agent device, the agent request comprising the grant token; obtain a credential for the service provider agent device under a condition that the grant token is valid; and provide the credential to the service provider agent device.

The validity time of the credential may expire before the validity time of the grant token.

The grant token may be unusable as a credential for the lock.

The grant token may be limited in the number of credentials it can be used for. In such a case, the instructions to obtain the credential comprise instructions that, when executed by the processor, cause the access coordination server to obtain the credential under a condition that the number of credentials for the grant token is not exceeded.

The instructions to obtain a grant token may comprise instructions that, when executed by the processor, cause the access coordination server to receive the grant token from a lock manager.

The instructions to determine the validity time for the grant token may comprise instructions that, when executed by the processor, cause the access coordination server to determine the validity time to be a validity time approved in the positive consumer response.

According to a third aspect, it is provided a computer program for providing access to a lock for provision of a service, the lock being associated with a service consumer, the method being performed in an access coordination server. The computer program comprises computer program code which, when run on the access coordination server causes the access coordination server to: receive a request for access to the lock, the request being based on the service consumer ordering a service requiring access to a physical space which is secured by the lock; send a consumer request to a service consumer device, asking whether to grant access to the lock for service provider to provide the service; receive a positive consumer response from the service consumer device, indicating that the service consumer allows the service provider to access the physical space secured by the lock; determine validity time for a grant token; obtain a grant token for the service provider, the grant token having the determined validity time; provide the grant token to the service provider; delete the grant token in the access coordination server; receive an agent request for access to the lock for a specific service provider agent device, the agent request comprising the grant token; obtain a credential for the service provider agent device under a condition that the grant token is valid; and provide the credential to the service provider agent device.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein are based on a grant token being generated when a service consumer accepts a service provider to gain access to a physical space secured by a lock under control of the service consumer. The grant token gives blanket access for the service provider during the validity time of the grant token. In this way, credentials can be generated for different service provider agents of the service provider when needed within the validity of the grant token. Moreover, the grant token is not stored centrally, but with the service provider, to reduce the risk of a hacker stealing valuable access data from a central location.

Figure 1:
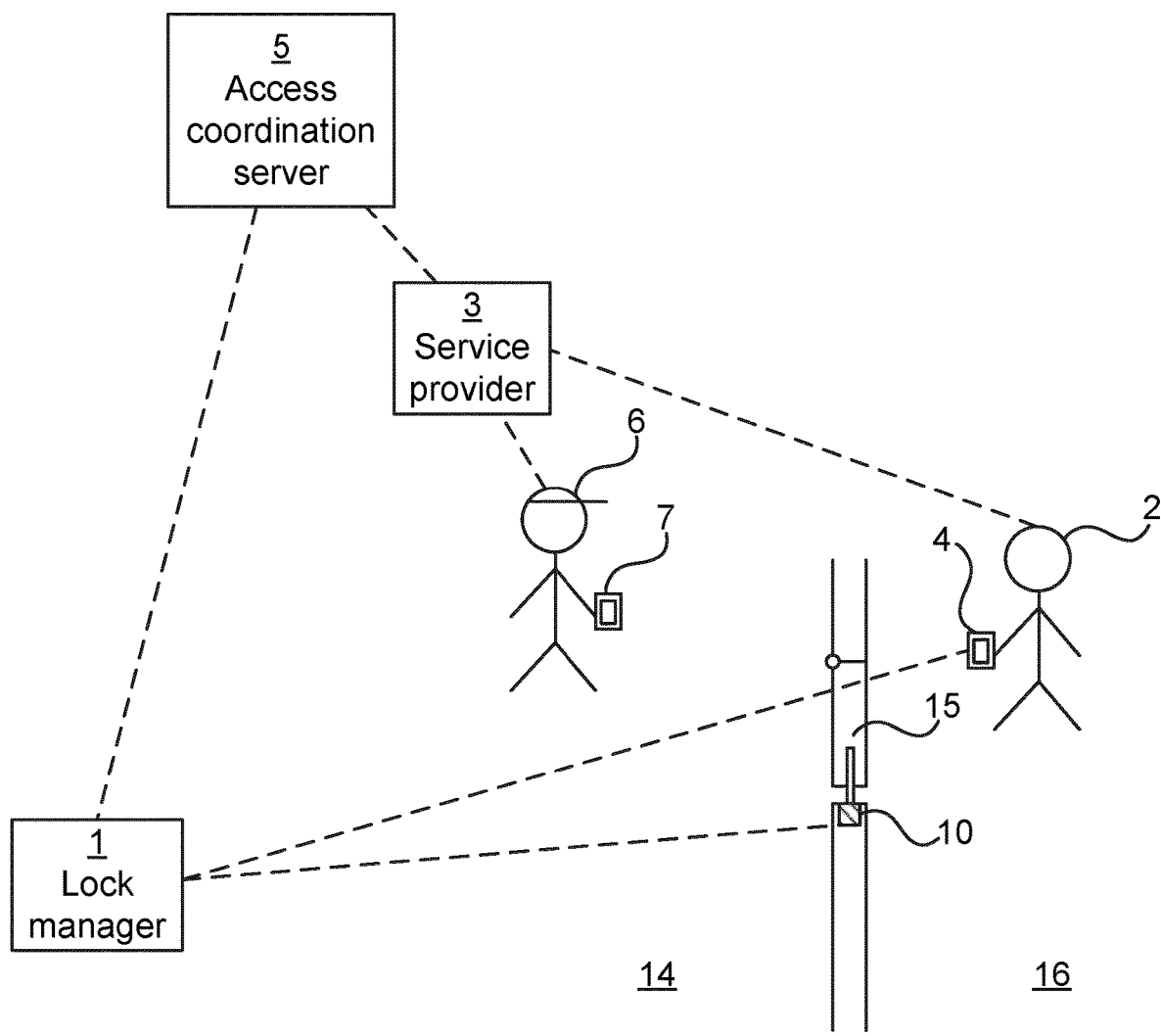
FIG. 1 is a schematic diagram showing an environment in which embodiments presented herein can be applied.

FIG. 1 is a schematic diagram showing an environment in which embodiments presented herein can be applied. Access to a physical space 16 is restricted by a physical barrier 15 which is selectively unlockable. The barrier 15 can be a door, gate, hatch, cabinet door, drawer, window, etc. The physical barrier 15 is provided in a surrounding physical structure (being a wall, fence, ceiling, floor, etc.) and stands between the restricted physical space 16 and an accessible physical space 14. Note that the accessible physical space 14 can be a restricted physical space in itself, but in relation to this physical barrier 15, the accessible physical space 14 is accessible. In order to control the locked or unlocked state of the barrier 15, a lock 10 is provided.

The owner or user of the lock 10 is here denoted a service consumer 2. The service consumer carries a service consumer device 4, which is a portable electronic device, e.g. a smartphone, mobile phone, tablet computer, laptop computer, etc.

The lock 10 is an electronic lock which is capable of communication with a lock manager 1. The lock manager can in turn, but does not need to, be connected to a plurality of similar locks. The lock manager 1 can configure the lock 10, e.g. by adding and/or removing credentials which should be allowed to have access. The lock 10 is an electronic lock and can be opened using a credential which is not mechanical. For instance, the credential can be a PIN (personal identification number) which is entered on a keypad connected to the lock 10. Alternatively or additionally, the lock 10 can be opened using a credential on an electronic key, and may be implemented as part of a mobile phone, a smartphone, a key fob, wearable device, smart phone case, access card, electronic physical key, etc. The electronic key can communicate with the lock 10 over a wired or wireless interface, e.g. using Bluetooth, Bluetooth Low Energy (BLE), any of the IEEE 802.15 standards, Radio Frequency Identification (RFID), Near Field Communication (NFC), any of the IEEE 802.11 standards, wireless USB (Universal Serial Bus), USB, Ethernet, serial connection (e.g. RS-485), etc. The lock 10 can communicate with a Lock Manager 1 over a wired or wireless interface, e.g. using Bluetooth, BLE, any of the IEEE 802.11 standards, wireless USB, USB, Ethernet, serial connection (e.g. RS-485), etc.

There is also a service provider server 3, controlled by a service provider. The service provider can e.g. be a delivery company, a cleaning company, a building company, a plumber, an electrician, etc. The service provider server 3 can also be provided by a third party, on behalf of the service provider. This is particularly useful for small businesses who may not want to set up their own service provider server.

Whenever any communication or electronic processing is mentioned herein to be performed by the service provider for ease of understanding, it is performed in the service provider server 3 (of the service provider). As explained in more detail below, the service consumer 2 orders a service from the service provider controlling the service provider server 3.

The service provider uses a service provider agent 6 to conduct the service. The service provider agent 6 can be an employee or a sub-contractor of the service provider. The service provider agent 6 carries a service provider agent device 7, which is a portable electronic device, e.g. a smartphone, mobile phone tablet computer, laptop computer, etc. The functions described herein as being performed by the service provider agent device 7, can e.g. be performed in a software application (also known as app) executing on the service provider agent device. The service provider agent device 7 can be used to request the unlocking of the lock 10.

An access coordination server 5 is a server which co-ordinates communication between the different parties involved in this scenario of providing a service which needs access to the restricted physical space 16.

Communication between the different nodes in FIG. 1 can occur using local communication, e.g. using Bluetooth, Bluetooth Low Energy (BLE), any of the IEEE 802.15 standards, any of the IEEE 802.11 standards, wireless USB (Universal Serial Bus), USB, Ethernet, serial connection (e.g. RS-485), etc. and/or over wide area communication such as cellular networks and the Internet. On a higher layer, Internet Protocol (IP) could be used for the communication.

Figure 2:
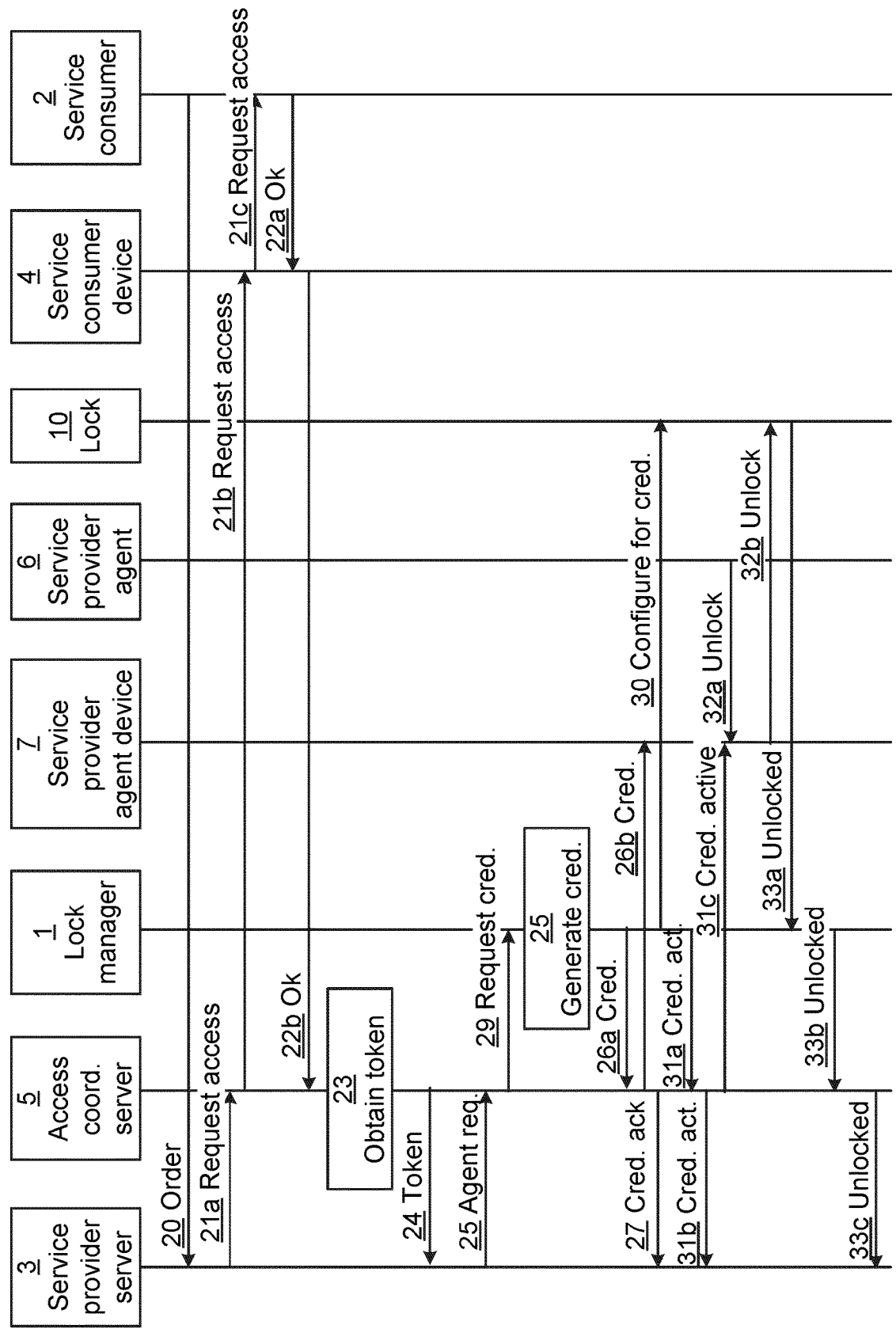
FIG. 2 is a sequence diagram illustrating communication in an example for providing a service in the environment of FIG. 1.

FIG. 2 is a sequence diagram illustrating communication in an example for providing a service in the environment of FIG. 1.

First, the service consumer 2 sends an order 20 for a service to a service provider server 3. The order 20 can be an order which is sent over an electronic service, such as the Internet, over telephone, in person, etc. When the order 20 is not electronic, a person of the service provider enters data of the order into the service provider server 3. It is to be noted that the order 20 can be an indirect order from the service consumer 2 via a third party and does not need to be directly from the service consumer 2 to the service provider server 3. For instance, in an online shopping example, the service consumer 2 orders a physical product to be delivered from a vendor (being a third party not shown in FIG. 2). The vendor, in turn, makes use of a delivery company for delivery of the physical product to the service consumer 2. The selection of delivery company can be performed by the service consumer or the vendor. In this case, the service consumer 2 indirectly orders a delivery service from the delivery company, in which case the delivery company is the service provider.

The service provider server 3 sends a request 21a for access to the access coordination server 5. The request 21a indicates that the service provider would like access to open the lock of the service consumer 2. The request 21a comprises an identifier (e.g. e-mail address or phone number, or an identifier that is associated with an e-mail address or phone number) of the service consumer 2 (or his/her lock 10) and a requested validity time for services provided by the service provider. The requested validity time can be relatively short, e.g. 24 hours or it can be longer, e.g. in the order of weeks, months or even years. This request 21a is not for a particular service provider agent, but for the service provider as a whole. Access for a particular service provider agent is requested later, as described below.

The access coordination server sends a corresponding request 21b for access to the service consumer device 4. The service consumer device 4 then asks the user in a request 21c for access, whether the service provider should be allowed access using the lock 10 in the suggested time window. This can e.g. be provided as a query in a software application (also known as app) of the service consumer device 4.

The service consumer 2 accepts the request (otherwise the sequence ends) in a positive consumer response 22a. The service consumer device 4 sends a corresponding positive consumer response ("ok") 22b to the access coordination server 5.

The access coordination server 5 now obtains 23 a grant token. The grant token can be obtained from the lock manager 1 or the grant token can be generated in the service consumer device 4. As explained in more detail below, the grant token has a relatively long validity time (compared to the credential mentioned below), allowing credentials (with potentially shorter validity times) to be generated within the validity time of the grant token.

The access coordination server 5 sends the grant token 24 to the service provider server 3. In this way, the service provider knows that the service consumer is ready to accept the delivery of the service and the service provider server 3 stores the grant token for use when a service provider agent has been selected. The access coordination server 5 deletes the grant token from its storage, whereby there is less risk of a hacker gaining access to any sensitive credential data (such as the grant token) by hacking the access coordination server 5. The selection of service provider agent (i.e. physical person) may take shorter or longer time, but once the service provider agent is selected, this is sent 25 to the access coordination server 5 in an agent request. The agent request 25 also contains the grant token previously provided to the service provider server 3 by the access coordination server 5.

The access coordination server 5 sends a request credential message 29 to the lock manager 1. The request credential message 29 comprises the grant token. The lock manager 1 checks the grant token to verify its validity (matching the particular lock and checking its validity time) and, only if successful, generates 25 (and optionally encrypts) the credential. The lock manager 1 then responds with the generated credential 26a to the access coordination server 5, which sends the generated credential 26b to the service provider agent device 7 (optionally via the service provider). Also, the access coordination server 5 sends a credential acknowledgement 27 to the service provider server 3 to inform that the credential has been provided to the service provider agent device 7.

The lock manager 1 can now configure the lock 10 to accept the credential by sending a configuration 30 for the lock to accept the generated credential. The lock manager 1 also sends a credential active message 31a to the access coordination server 5, which in turn sends a corresponding credential active message 31b to the service provider server 3, whereby the service provider is made aware of the fact that the lock 10 is ready to accept the credential provided to the service provider agent 6. The access coordination server 5 also sends a credential active message 31c to the service provider agent device 7.

Once the service provider agent 6 arrives at the site of the lock 10, the service provider agent 6 provides unlock input 32a to the service provider agent device 7 (e.g. using the user interface or by placing the service provider agent device 7 in the immediate vicinity of the lock 1o). The service provider agent device 7 then unlocks 32b the lock 10, either directly using communication between the service provider agent device 7 and the lock 10, or by decrypting and displaying the PIN of the generated credential to the service provider agent 6 who manually inputs the PIN to the lock 10.

In one embodiment, the service provider agent device 7 unlocks 32*b* the lock 10 by communicating with the lock manager 1 to verify the credential of the service provider agent device 7, whereby, after verification, the lock is unlocked. The service provider agent device 7, the lock manager 1 or the lock 10 only allows the unlocking if the validity time of the credential encompasses the current time.

When the lock 10 is unlocked, the lock 10 sends an unlocked message 33*a* to the lock manager 1. The lock manager 1 sends a corresponding unlocked message 33*b* to the access coordination server 5 which, in turn, sends an unlocked message 33*c* to the service provider server 3. In this way, the service provider is made aware of the fact that the service provider agent 6 has unlocked the lock 10.

Figure 3:
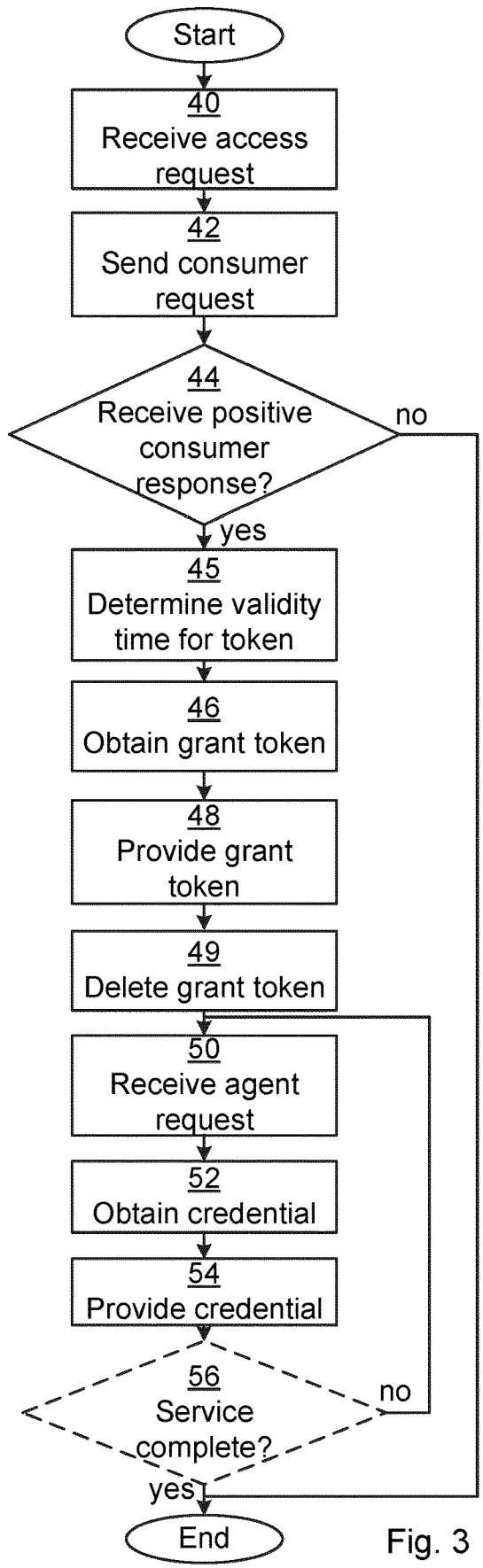
FIG. 3 is a flow chart illustrating embodiments of method for providing access to a lock for provision of a service.

FIG. 3 is a flow chart illustrating embodiments of method for providing access to a lock for provision of a service. As explained above, the lock is associated with a service consumer. The method is performed in the access coordination server and corresponds to the actions of the access coordination server illustrated in FIG. 2 and described above. Using this method, the service consumer can order a service and conveniently and securely provide access to a physical space secured by a lock. Moreover, the service consumer can give blanket permission for the service provider during a certain validity period, whereby the service consumer does not need to be bothered with permission queries for each individual service provider agent within the validity period.

In a receive access request step 40, the access coordination server receives a request for access to the lock. The request is based on the service consumer ordering a service requiring access to a physical space which is secured by the lock. The access request can be received from the service provider. Optionally, the access request comprises a requested validity time, during which the service provider will be able to assign service provider agents who will have access to the physical space secured by the lock.

In a send consumer request step 42, the access coordination server sends a consumer request to a service consumer device, asking whether to grant access to the lock for a service provider agent to provide the service. When the access request comprises a requested validity time, this validity time is included in the consumer request. Alternatively, the access coordination server determines a validity time for which access is to be requested for the service provider.

In a conditional receive positive consumer response step 44, the access coordination server determines whether a positive consumer response is received from the service consumer device, wherein the positive consumer response indicates that the service consumer allows the service provider to access the physical space secured by the lock. If the positive consumer response is received, the method proceeds to a determine validity time for token step 45. Otherwise, the method ends.

Using this confirmation procedure with the service consumer, the service consumer needs to provide an acceptance that the lock needs to be opened for service provider agent which provides the service. Once approved, this acceptance is a blanket acceptance allowing the service provider access to the lock during the requested validity time for any service provider agent of the service provider.

In a determine validity time for token step 45, the access coordination server determines a validity time for the grant token. For instance, the validity time can be determined to be a validity time approved by the positive consumer response. In one embodiment, such a validity time is included in the consumer request, which is verified in the positive consumer response. In one embodiment, the validity time can be determined to be a validity time explicitly included the positive consumer response. In either of these two embodiments, the validity time for the grant token will mirror a validity time approved by the service consumer. In one embodiment, the validity time is determined as a time defined by a duration after receiving the positive consumer response. For instance, the system can be set up so that the validity time is always a certain number of hours, days, etc. after the positive consumer response. The service consumer device would then be configured to inform the service consumer of such a validity time when asking the service consumer for approval.

In the obtain grant token step 46, the access coordination server obtains a grant token for the service provider. The grant token has the determined validity time. The grant token can be limited in the number of credentials it can be used for. The grant token is defined for a particular lock or a particular group of locks of the service consumer. The grant token can be obtained from the lock manager or the grant token can be obtained from the service consumer device. The grant token may be unusable as a credential for the lock. In other words, the grant token cannot be used directly to open the lock, but can be provided to the lock manager 1 for generation of a credential which is able to open the lock.

In a provide grant token step 48, the access coordination server provides the grant token to the service provider.

In a delete grant token step 49, the access coordination server (actively) deletes the grant token in the access coordination server. In other words, the access coordination server avoids storing the grant token for any time longer than what is needed to provide the grant token to the service provider. The deletion can be ensured to occur within one second of providing the grant token to the service provider.

In a receive agent request step 50, the access coordination server receives an agent request for access to the lock for a specific service provider agent device. The agent request comprising the grant token, i.e. the same grant token that was provided to the service provider in step 48. The agent request is received from the service provider. This step can occur minutes, hours, days, or weeks after the delete grant token step 49.

In an obtain credential step 52, the access coordination server obtains a credential for the service provider agent device under a condition that the grant token is valid. The credential can be obtained from the lock manager, i.e. the lock manager generates the credential on command from the access coordination server. It is to be noted that the grant token cannot be used as a credential to gain access of the lock; the grant token is provided to the lock manager for generating (when the grant token is valid) a credential that is provided to the lock. This provides additional security in that even if an attacker were to get hold of the grant token, the lock manager could be configured to only allow credential requests from (containing the grant token) from pre-configured access coordination servers (e.g. identified by IP address range or by cryptographic signatures). Moreover, the lock manager is given control of when credentials are to be provided.

The validity time of the credential can expire before the validity time of the grant token. In this way, the same grant token can be used for several credentials, e.g. for different service agents of the service provider, within the (blanket) validity time of the grant token, which corresponds to the time accepted by the service consumer for the service provider to provide the service. In other words, the service consumer provides access to the service provider within the blanket validity time, and the service provider then requests the provision of a credential for a service provider agent within that blanket validity time, which is enforced using the grant token.

Optionally, the credential is only obtained under a condition that the number of credentials for the grant token is not exceeded, when such a number is defined for the grant token. Optionally, the credential is only obtained under a condition that the service consumer has not revoked access for the service provider. In this way, the service consumer can revoke access for any service provider if needed, e.g. if a cleaning contract with a particular service provider is terminated.

In a provide credential step 54, the access coordination server provides the credential to the service provider agent device. This allows the service provider agent device to be used to unlock the lock. The credential is then actively deleted form the access coordination server 5.

In an optional conditional service complete step 56, the access coordination server determines if the service related to the positive consumer response and the grant token is complete. If this is the case, the method ends. Otherwise, the method returns to wait for a new allocation of a service agent, by returning to the receive agent request step 50.

Figure 4:
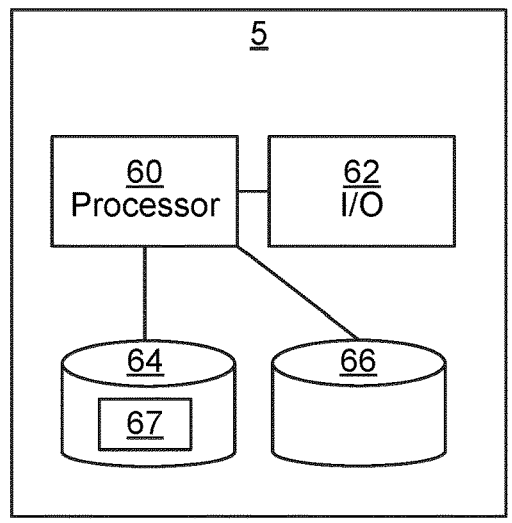
FIG. 4 is a schematic diagram illustrating components of the access coordination server of FIG. 1.

FIG. 4 is a schematic diagram illustrating components of the access coordination server 5 of FIG. 1. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIG. 3 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The access coordination server 5 further comprises an I/O interface 62 for communicating with other external entities, such as the lock manager 1, the service consumer device and the service provider. The I/O interface 62 can comprise components communication over any one or more of any of the IEEE 802.11 standards, wireless USB (Universal Serial Bus), USB, Ethernet, serial connection (e.g. RS-485), Bluetooth, Bluetooth Low Energy (BLE), any of the IEEE 802.15 standards, Radio Frequency Identification (RFID), Near Field Communication (NFC), etc.

Other components of the access coordination server 5 are omitted in order not to obscure the concepts presented herein.

Figure 5:
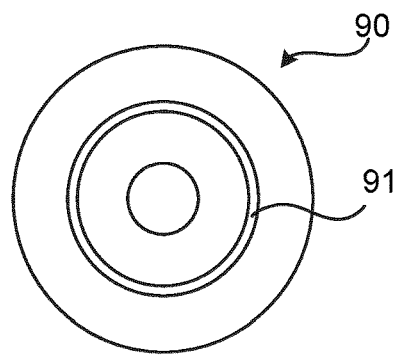
FIG. 5 shows one example of a computer program product comprising computer readable means.

FIG. 5 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid-state memory, e.g. a Universal Serial Bus (USB) drive.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for providing access to a lock for provision of a service, the lock being associated with a service consumer, the method being performed in an access coordination server and comprising:
   receiving a request for access to the lock from a service provider, the request being based on the service consumer ordering a service requiring access to a physical space which is secured by the lock;
   sending a consumer request to a service consumer device, asking whether to grant access to the lock for the service provider to provide the service;
   receiving a positive consumer response from the service consumer device, indicating that the service consumer allows the service provider to access the physical space secured by the lock;
   determining validity time for a grant token;
   obtaining a grant token for the service provider, the grant token having the determined validity time, wherein the grant token gives blanket access for the service provider during the validity time of the grant token;
   providing the grant token to the service provider;
   deleting the grant token in the access coordination server;
   receiving, after deleting the grant token, an agent request for access to the lock for a specific service provider agent device, the agent request comprising the grant token;
   obtaining a credential for the service provider agent device under a condition that the grant token is valid; and
   providing the credential to the service provider agent device.

2. The method according to claim 1, wherein a validity time of the credential expires before the validity time of the grant token.

3. The method according to claim 1, wherein the grant token is unusable as a credential for the lock.

4. The method according to claim 1, wherein the grant token is limited in the number of credentials it can be used for, and wherein obtaining the credential is performed under a condition that the number of credentials for the grant token is not exceeded.

5. The method according to claim 1, wherein obtaining a grant token comprises receiving the grant token from a lock manager.

6. The method according to claim 1, wherein determining a validity time for the grant token comprises determining the validity time to be a validity time approved in the positive consumer response.

7. An access coordination server for providing access to a lock for provision of a service, the lock being associated with a service consumer, the access coordination server comprising:
a processor; and
a memory storing instructions that, when executed by the processor, cause the access coordination server to:
receive a request for access to the lock from a service provider, the request being based on the service consumer ordering a service requiring access to a physical space which is secured by the lock;
send a consumer request to a service consumer device, asking whether to grant access to the lock for the service provider to provide the service;
receive a positive consumer response from the service consumer device, indicating that the service consumer allows the service provider to access the physical space secured by the lock;
determine validity time for a grant token;
obtain a grant token for the service provider, the grant token having the determined validity time, wherein the grant token gives blanket access for the service provider during the validity time of the grant token;
provide the grant token to the service provider;
delete the grant token in the access coordination server;
receive, after the instructions to delete the grant token are executed, an agent request for access to the lock for a specific service provider agent device, the agent request comprising the grant token;
obtain a credential for the service provider agent device under a condition that the grant token is valid; and
provide the credential to the service provider agent device.

8. The access coordination server according to claim 7, wherein a validity time of the credential expires before the validity time of the grant token.

9. The access coordination server according to claim 7, wherein the grant token is unusable as a credential for the lock.

10. The access coordination server according to claim 7, wherein the grant token is limited in the number of credentials it can be used for, and wherein the instructions to obtain the credential comprise instructions that, when executed by the processor, cause the access coordination server to obtain the credential under a condition that the number of credentials for the grant token is not exceeded.

11. The access coordination server according to claim 7, wherein the instructions to obtain a grant token comprise instructions that, when executed by the processor, cause the access coordination server to receive the grant token from a lock manager.

12. The access coordination server according to claim 7, wherein the instructions to determine the validity time for the grant token comprise instructions that, when executed by the processor, cause the access coordination server to determine the validity time to be a validity time approved in the positive consumer response.

13. A computer program for providing access to a lock for provision of a service, the lock being associated with a service consumer, the computer program comprising computer program code which, when run on the access coordination server causes the access coordination server to:
receive a request for access to the lock from a service provider, the request being based on the service consumer ordering a service requiring access to a physical space which is secured by the lock;
send a consumer request to a service consumer device, asking whether to grant access to the lock for the service provider to provide the service;
receive a positive consumer response from the service consumer device, indicating that the service consumer allows the service provider to access the physical space secured by the lock;
determine validity time for a grant token;
obtain a grant token for the service provider, the grant token having the determined validity time, wherein the grant token gives blanket access for the service provider during the validity time of the grant token;
provide the grant token to the service provider;
delete the grant token in the access coordination server;
receive, after the code to delete the grant token is run, an agent request for access to the lock for a specific service provider agent device, the agent request comprising the grant token;
obtain a credential for the service provider agent device under a condition that the grant token is valid; and
provide the credential to the service provider agent device.

14. A computer program product comprising a computer program according to claim 13 and a non-transitory computer readable means on which the computer program is stored.

* * * * *